(12) United States Patent
Sommer et al.

(10) Patent No.: US 8,713,330 B1
(45) Date of Patent: Apr. 29, 2014

(54) DATA SCRAMBLING IN MEMORY DEVICES

(75) Inventors: Naftali Sommer, Rishon Lezion (IL); Micha Anholt, Tel Aviv (IL); Oren Golov, Hod Hasharon (IL); Uri Perlmutter, Ra'anana (IL); Shai Winter, Giva'ataim (IL)

(73) Assignee: Apple Inc., Cupertino, CA (US)

( * ) Notice: Subject to any disclaimer, the term of this patent is extended or adjusted under 35 U.S.C. 154(b) by 777 days.

(21) Appl. No.: 12/607,078

(22) Filed: Oct. 28, 2009

Related U.S. Application Data

(60) Provisional application No. 61/109,767, filed on Oct. 30, 2008, provisional application No. 61/115,085, filed on Nov. 16, 2008.

(51) Int. Cl.
*H04L 9/00* (2006.01)
*G06F 15/16* (2006.01)

(52) U.S. Cl.
USPC .......................... 713/193; 714/773; 714/768

(58) Field of Classification Search
USPC .................................. 713/193; 714/773, 168
See application file for complete search history.

(56) References Cited

U.S. PATENT DOCUMENTS

| | | |
|---|---|---|
| 3,668,631 A | 6/1972 | Griffith et al. |
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,608,687 A | 8/1986 | Dutton |
| 4,654,847 A | 3/1987 | Dutton |
| 5,077,722 A | 12/1991 | Geist et al. |
| 5,126,808 A | 6/1992 | Montalvo et al. |
| 5,182,558 A | 1/1993 | Mayo |
| 5,182,752 A | 1/1993 | DeRoo et al. |
| 5,276,649 A | 1/1994 | Hoshita et al. |
| 5,287,469 A | 2/1994 | Tsuboi |
| 5,365,484 A | 11/1994 | Cleveland et al. |
| 5,450,424 A | 9/1995 | Okugaki et al. |
| 5,469,444 A | 11/1995 | Endoh et al. |
| 5,533,190 A | 7/1996 | Binford et al. |
| 5,657,332 A | 8/1997 | Auclair et al. |
| 5,682,352 A | 10/1997 | Wong et al. |
| 5,798,966 A | 8/1998 | Keeney |

(Continued)

FOREIGN PATENT DOCUMENTS

| | | |
|---|---|---|
| EP | 0783754 B1 | 7/1997 |
| EP | 1434236 B1 | 6/2004 |

(Continued)

OTHER PUBLICATIONS

U.S. Appl. No. 12/323,544 Office Action dated Dec. 13, 2011.

(Continued)

*Primary Examiner* — Brandon Hoffman
*Assistant Examiner* — Samuel Ambaye
(74) *Attorney, Agent, or Firm* — Meyertons, Hood, Kivlin, Kowert & Goetzel, P.C.

(57) ABSTRACT

A method for data storage includes scrambling data for storage in a memory device using a given scrambling seed. A statistical distribution of the scrambled data is assessed, and a measure of randomness of the statistical distribution is computed. A scrambling configuration of the data is modified responsively to the measure of randomness, and the data having the modified scrambling configuration is stored in the memory device.

22 Claims, 3 Drawing Sheets

(56) References Cited

U.S. PATENT DOCUMENTS

| | | |
|---|---|---|
| 5,799,200 A | 8/1998 | Brant et al. |
| 5,867,114 A | 2/1999 | Barbir |
| 5,867,429 A | 2/1999 | Chen et al. |
| 5,889,937 A | 3/1999 | Tamagawa |
| 5,937,424 A | 8/1999 | Leak et al. |
| 5,995,417 A | 11/1999 | Chen et al. |
| 6,040,993 A | 3/2000 | Chen et al. |
| 6,178,466 B1 | 1/2001 | Gilbertson et al. |
| 6,240,458 B1 | 5/2001 | Gilbertson |
| 6,259,627 B1 | 7/2001 | Wong |
| 6,278,632 B1 | 8/2001 | Chevallier |
| 6,314,044 B1 | 11/2001 | Sasaki et al. |
| 6,366,496 B1 | 4/2002 | Torelli et al. |
| 6,405,342 B1 | 6/2002 | Lee |
| 6,445,602 B1 | 9/2002 | Kokudo et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,558,967 B1 | 5/2003 | Wong |
| 6,640,326 B1 | 10/2003 | Buckingham et al. |
| 6,687,155 B2 | 2/2004 | Nagasue |
| 6,732,250 B2 | 5/2004 | Durrant |
| 6,774,808 B1 | 8/2004 | Hibbs et al. |
| 6,804,805 B2 | 10/2004 | Rub |
| 6,809,964 B2 | 10/2004 | Moschopoulos et al. |
| 6,819,592 B2 | 11/2004 | Noguchi et al. |
| 6,851,081 B2 | 2/2005 | Yamamoto |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 7,006,379 B2 | 2/2006 | Noguchi et al. |
| 7,039,846 B2 | 5/2006 | Hewitt et al. |
| 7,042,766 B1 | 5/2006 | Wang et al. |
| 7,054,199 B2 | 5/2006 | Lee et al. |
| 7,151,692 B2 | 12/2006 | Wu |
| 7,158,058 B1 | 1/2007 | Yu |
| 7,177,199 B2 | 2/2007 | Chen et al. |
| 7,184,338 B2 | 2/2007 | Nakagawa et al. |
| 7,190,614 B2 | 3/2007 | Wu |
| 7,193,898 B2 | 3/2007 | Cernea |
| 7,196,644 B1 | 3/2007 | Anderson et al. |
| 7,196,933 B2 | 3/2007 | Shibata |
| 7,210,077 B2 | 4/2007 | Brandenberger et al. |
| 7,254,763 B2 | 8/2007 | Aadsen et al. |
| 7,266,069 B2 | 9/2007 | Chu |
| 7,269,778 B1 * | 9/2007 | Feng et al. .................... 714/758 |
| 7,272,757 B2 | 9/2007 | Stocken |
| 7,280,409 B2 | 10/2007 | Misumi et al. |
| 7,280,415 B2 | 10/2007 | Hwang et al. |
| 7,301,817 B2 | 11/2007 | Li et al. |
| 7,310,269 B2 | 12/2007 | Shibata |
| 7,310,272 B1 | 12/2007 | Mokhlesi et al. |
| 7,310,347 B2 | 12/2007 | Lasser |
| 7,312,727 B1 | 12/2007 | Feng et al. |
| 7,328,384 B1 | 2/2008 | Kulkarni et al. |
| 7,343,330 B1 | 3/2008 | Boesjes et al. |
| 7,365,671 B1 | 4/2008 | Anderson |
| 7,405,974 B2 | 7/2008 | Yaoi et al. |
| 7,408,810 B2 | 8/2008 | Aritome et al. |
| 7,409,623 B2 | 8/2008 | Baker et al. |
| 7,433,697 B2 | 10/2008 | Karaoguz et al. |
| 7,434,111 B2 | 10/2008 | Sugiura et al. |
| 7,440,324 B2 | 10/2008 | Mokhlesi |
| 7,440,331 B2 | 10/2008 | Hemink |
| 7,447,970 B2 | 11/2008 | Wu et al. |
| 7,450,421 B2 | 11/2008 | Mokhlesi et al. |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,469,049 B1 | 12/2008 | Feng |
| 7,483,319 B2 | 1/2009 | Brown |
| 7,487,394 B2 | 2/2009 | Forhan et al. |
| 7,492,641 B2 | 2/2009 | Hosono et al. |
| 7,526,711 B2 | 4/2009 | Orio |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,631,245 B2 | 12/2009 | Lasser |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,733,712 B1 | 6/2010 | Walston et al. |
| 7,761,624 B2 | 7/2010 | Karamcheti et al. |
| 7,797,609 B2 | 9/2010 | Neuman |
| 7,810,017 B2 | 10/2010 | Radke |
| 7,904,783 B2 | 3/2011 | Brandman et al. |
| 7,929,549 B1 | 4/2011 | Talbot |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2002/0056064 A1 | 5/2002 | Kidorf et al. |
| 2002/0133684 A1 | 9/2002 | Anderson |
| 2002/0166091 A1 | 11/2002 | Kidorf et al. |
| 2004/0223371 A1 | 11/2004 | Roohparvar |
| 2005/0030788 A1 | 2/2005 | Parkinson et al. |
| 2005/0144361 A1 | 6/2005 | Gonzalez et al. |
| 2005/0157555 A1 | 7/2005 | Ono et al. |
| 2006/0106972 A1 | 5/2006 | Gorobets et al. |
| 2006/0179334 A1 | 8/2006 | Brittain et al. |
| 2006/0190699 A1 | 8/2006 | Lee |
| 2006/0221692 A1 | 10/2006 | Chen |
| 2006/0221714 A1 | 10/2006 | Li et al. |
| 2006/0239081 A1 | 10/2006 | Roohparvar |
| 2007/0104211 A1 | 5/2007 | Opsasnick |
| 2007/0195602 A1 | 8/2007 | Fong et al. |
| 2007/0208819 A1 * | 9/2007 | Talbot et al. .................. 709/208 |
| 2007/0291571 A1 | 12/2007 | Balasundaram |
| 2007/0297234 A1 | 12/2007 | Cernea et al. |
| 2008/0052446 A1 | 2/2008 | Lasser et al. |
| 2008/0089123 A1 | 4/2008 | Chae et al. |
| 2008/0104312 A1 | 5/2008 | Lasser |
| 2008/0123426 A1 | 5/2008 | Lutze et al. |
| 2008/0151618 A1 | 6/2008 | Sharon et al. |
| 2008/0151667 A1 | 6/2008 | Miu et al. |
| 2008/0209116 A1 | 8/2008 | Caulkins |
| 2008/0215798 A1 * | 9/2008 | Sharon et al. .................. 711/103 |
| 2008/0239093 A1 | 10/2008 | Easwar et al. |
| 2008/0253188 A1 | 10/2008 | Aritome |
| 2009/0013233 A1 | 1/2009 | Radke |
| 2009/0034337 A1 | 2/2009 | Aritome |
| 2009/0073762 A1 | 3/2009 | Lee et al. |
| 2009/0094930 A1 | 4/2009 | Schwoerer |
| 2009/0112949 A1 | 4/2009 | Ergan et al. |
| 2009/0132755 A1 | 5/2009 | Radke |
| 2009/0150894 A1 | 6/2009 | Huang et al. |
| 2009/0157950 A1 | 6/2009 | Selinger |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0204872 A1 | 8/2009 | Yu et al. |
| 2009/0225595 A1 | 9/2009 | Kim |
| 2009/0265509 A1 | 10/2009 | Klein |

(56) References Cited

U.S. PATENT DOCUMENTS

| | | |
|---|---|---|
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0061151 A1 | 3/2010 | Miwa et al. |
| 2010/0082883 A1 | 4/2010 | Chen et al. |
| 2010/0110580 A1 | 5/2010 | Takashima |
| 2010/0142268 A1 | 6/2010 | Aritome |
| 2010/0169743 A1 | 7/2010 | Vogan et al. |
| 2010/0174847 A1 | 7/2010 | Paley et al. |
| 2010/0211803 A1 | 8/2010 | Lablans |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0149657 A1 | 6/2011 | Haratsch et al. |
| 2011/0302354 A1 | 12/2011 | Miller |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |

OTHER PUBLICATIONS

U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
U.S. Appl. No. 11/995,814 Official Action dated Dec. 17, 2010.
U.S. Appl. No. 12/388,528 Official Action dated Nov. 29, 2010.
U.S. Appl. No. 12/251,471 Official Action dated Jan. 3, 2011.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
Ubuntu Forums, "Memory Stick Failed 10 Superblock", posted Nov. 11, 2009.
Super User Forums, "SD Card Failure, can't read superblock", posted Aug. 8, 2010.
U.S. Appl. No. 12/987,174 "Redundant Data Storage in Multi-Die Memory Systems", filed Jan. 10, 2011.
U.S. Appl. No. 12/987,175 "Redundant Data Storage Schemes for Multi-Die Memory Systems" filed Jan. 10, 2011.
U.S. Appl. No. 12/963,649 "Memory Management Schemes for Non-Volatile Memory Devices" filed Dec. 9, 2010.
U.S. Appl. No. 13/021,754 "Reducing Peak Current in Memory Systems" filed Feb. 6, 2011.
U.S. Appl. No. 12/019,011 Official Action dated Nov. 20, 2009.
Takeuchi et al., "A Multipage Cell Architecture for High-Speed Programming Multilevel NAND Flash Memories", IEEE Journal of Solid State Circuits, vol. 33, No. 8, Aug. 1998.
U.S. Appl. No. 12/323,544 Official Action dated Mar. 9, 2012.
Chinese Patent Application No. 200780026181.3 Official Action dated Mar. 7, 2012.
Chinese Patent Application No. 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model-5 (SAM-5)", INCITS document T10/2104-D, revision 01, Jan. 28, 2009.
SAS Protocol, "Information Technology—Serial Attached SCSI-2 (SAS-2)", INCITS document T10/1760-D, revision 15a, Feb. 22, 2009.
JEDEC Standard JESD84-C44, "Embedded MultiMediaCard (e•MMC) Mechanical Standard, with Optional Reset Signal", Jedec Solid State Technology Association, USA, Jul. 2009.
JEDEC, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Serial ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.

(56) References Cited

OTHER PUBLICATIONS

Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application No. 200780026181.3 Official Action dated Apr. 8, 2011.
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.
Blahut, R.E., "Theory and Practice of Error Control Codes," Addison-Wesley, May, 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.
Engh et al., "A self adaptive programming method with 5 mV accuracy for multi-level storage in Flash", pp. 115-118, Proceedings of the IEEE 2002 Custom Integrated Circuits Conference, May 12-15, 2002.
Goodman et al., "On-Chip ECC for Multi-Level Random Access Memories," Proceedings of the IEEE/CAM Information Theory Workshop, Ithaca, USA, Jun. 25-29, 1989.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Horstein, "On the Design of Signals for Sequential and Nonsequential Detection Systems with Feedback," IEEE Transactions on Information Theory IT-12:4 (Oct. 1966), pp. 448-455.
Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kawaguchi et al. 1995. A flash-memory based file system. In Proceedings of the USENIX 1995 Technical Conference, New Orleans, Louisiana. 155-164.
Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 Mb/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Onfi, "Open NAND Flash Interface Specification," revision 1.0, Dec. 28, 2006.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW'2003), Paris, France, Mar. 31-Apr. 4, 2003.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.

(56) References Cited

OTHER PUBLICATIONS

International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
Sommer et al., U.S. Appl. No. 12/497,707 "Data Storage in Analog Memory Cells with Protection Against Programming Interruption" filed Jul. 6, 2009.
Winter et al., U.S. Appl. No. 12/534,898 "Data Storage Using Modified Voltages" filed Aug. 4, 2009.
Winter et al., U.S. Appl. No. 12/534,893 "Improved Data Storage in Analog Memory Cells Using Modified Pass Voltages" filed Aug. 4, 2009.
Shalvi et al., U.S. Appl. No. 12/551,583 "Segmented Data Storage" filed Sep. 1, 2009.
Shalvi et al., U.S. Appl. No. 12/551,567 "Reliable Data Storage in Analog Memory Cells Subjected to Long Retention Periods" filed Sep. 1, 2009.
Perlmutter et al., U.S. Appl. No. 12/558,528 "Estimation of Memory Cell Read Thresholds by Sampling Inside Programming Level Distribution Intervals" filed Sep. 13, 2009.
Sokolov, D., U.S. Appl. No. 12/579,430 "Efficient Programming of Analog Memory Cell Devices" filed Oct. 15, 2009.
Shalvi, O., U.S. Appl. No. 12/579,432 "Efficient Data Storage in Storage Device Arrays" filed Oct. 15, 2009.
Sommer et al., U.S. Appl. No. 12/607,085 "Data Scrambling Schemes for Memory Devices" filed Oct. 28, 2009.
U.S. Appl. No. 12/880,101 "Reuse of Host Hibernation Storage Space by Memory Controller", filed Sep. 12, 2010.
U.S. Appl. No. 12/890,724 "Error Correction Coding Over Multiple Memory Pages", filed Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
U.S. Appl. No. 11/945,575 Official Action dated Aug. 24, 2010.
U.S. Appl. No. 12/045,520 Official Action dated Nov. 16, 2010.

\* cited by examiner

DATA SCRAMBLING IN MEMORY DEVICES

CROSS-REFERENCE TO RELATED APPLICATIONS

This application claims the benefit of U.S. Provisional Patent Application 61/109,767, filed Oct. 30, 2008, and U.S. Provisional Patent Application 61/115,085, filed Nov. 16, 2008, whose disclosures are incorporated herein by reference. This application is related to a U.S. patent application entitled "Data Scrambling Schemes for Memory devices," filed on even date, which is assigned to the assignee of the present patent application and whose disclosure is incorporated herein by reference.

FIELD OF THE INVENTION

The present invention relates generally to data storage, and particularly to methods and systems for data scrambling in memory devices.

BACKGROUND OF THE INVENTION

Several types of memory devices, such as Flash memories, use arrays of analog memory cells for storing data. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible programming levels. Higher-density devices, often referred to as Multi-Level Cell (MLC) devices, store two or more bits per memory cell, i.e., can be programmed to assume more than two possible programming levels.

Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Eitan et al., describe another type of analog memory cell called Nitride Read Only Memory (NROM) in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference. Other exemplary types of analog memory cells are Floating Gate (FG) cells, Ferroelectric RAM (FRAM) cells, magnetic RAM (MRAM) cells, Charge Trap Flash (CTF) and phase change RAM (PRAM, also referred to as Phase Change Memory—PCM) cells. FRAM, MRAM and PRAM cells are described, for example, by Kim and Koh in "Future Memory Technology including Emerging New Memories," Proceedings of the $24^{th}$ International Conference on Microelectronics (MIEL), Nis, Serbia and Montenegro, May 16-19, 2004, volume 1, pages 377-384, which is incorporated herein by reference.

Some memory systems scramble, or randomize, the data before storing it in memory. For example, U.S. Patent Application Publication 2008/0215798, whose disclosure is incorporated herein by reference, describes randomization schemes, in which original data to be stored in a non-volatile memory are first randomized while preserving the size of the original data. In response for a request for the original data, the randomized data are retrieved, de-randomized and exported without authenticating the requesting entity. ECC encoding is applied either before or after randomizing. Correspondingly, ECC decoding is applied either after or before de-randomizing.

U.S. Patent Application Publication 2009/0204824, whose disclosure is incorporated herein by reference, describes data scrambling techniques implemented externally to a Flash memory device. The data scrambling technique preferably uses a logical address, such as logical block address or logical page address, rather than a physical address, to determine a seed scrambling key.

PCT International Publication WO 2008/099958, whose disclosure is incorporated herein by reference, describes a method of writing data into a semiconductor memory, in which nonvolatile memory cells each having a gate connected to a word line are connected in series. A scrambling method for the data is selected according to a word line address of the memory cells into which the data is to be written. The data is scrambled using the selected scrambling method, and the scrambled data is written into the memory cells according to the word line address.

U.S. Pat. No. 4,993,029, whose disclosure is incorporated herein by reference, describes a method and apparatus for randomizing data in a direct access storage device. The data is randomized, and subsequently de-randomized, in a repeating or pseudo-random, complementary sequence for each byte. The complementary randomizing/de-randomizing sequence is determined by the count contained in a counter. This counter is initialized at the beginning of a record, and is progressively incremented to the predetermined next count as each byte is processed.

SUMMARY OF THE INVENTION

An embodiment of the present invention provides a method for data storage, including:

scrambling data for storage in a memory device using a given scrambling seed;

assessing a statistical distribution of the scrambled data, and computing a measure of randomness of the statistical distribution; and responsively to the measure of randomness, modifying a scrambling configuration of the data and storing the data having the modified scrambling configuration in the memory device.

In some embodiments, computing the measure of the randomness includes comparing a first number of "0" bit values in the scrambled data with a second number of "1" bit values in the scrambled data. In an embodiment, modifying the scrambling configuration includes adding one or more dummy bits to the scrambled data. In a disclosed embodiment, modifying the scrambling configuration includes scrambling the data using another scrambling seed, different from the given scrambling seed.

In some embodiments, scrambling the data includes scrambling the data using two or more candidate scrambling seeds, assessing the statistical distribution and computing the level of randomness include computing a respective level of randomness for the data scrambled using each of the candidate scrambling seeds, and modifying the scrambling configuration includes selecting the data scrambled using one of the candidate scrambling seeds having a best level of randomness. In an embodiment, scrambling the data includes operating two or more scrambling units concurrently, each scrambling unit scrambling the data using a respective one of the candidate scrambling seeds. In a disclosed embodiment, modifying the scrambling configuration includes dividing the data into multiple sections, scrambling the data in at least one of the sections using one of the candidate scrambling seeds, and scrambling the data in at least another of the sections using another of the candidate scrambling seeds.

In another embodiment, modifying the scrambling configuration includes dividing the data into multiple sections, scrambling the data in at least one of the sections using a scrambling sequence derived from the given scrambling seed, and scrambling the data in at least another of the sections using an inverse of the scrambling sequence. In yet another embodiment, the memory device includes a group of multi-level memory cells, each storing at least first and second bits in one of multiple different memory states, and modifying the scrambling configuration includes balancing respective numbers of the memory cells in the group that are programmed to the different programming states. In an embodiment, the first bits of the memory cells in the group store a first memory page and the second bits of the memory cells in the group store a second memory page, and balancing the numbers includes selecting first and second scrambling seeds, for respectively scrambling the first and second memory pages, from respective first and second disjoint sets of candidate scrambling seeds.

There is additionally provided, in accordance with an embodiment of the present invention, a method for data storage, including:

in a memory controller that controls one or more memory devices, modifying a counter value per each memory page programmed in the memory devices by the memory controller;

selecting, based on the counter value, a scrambling seed for scrambling a given memory page; and scrambling the given memory page using the selected scrambling seed, and storing the scrambled memory page in one of the memory devices.

In some embodiments, modifying the counter value includes one of incrementing and decrementing the counter value, modulo a prime number. In an embodiment, modifying the counter value includes modifying the counter value per at least one memory page programmed in a memory device other than the one of the memory devices in which the scrambled memory page is stored.

There is also provided, in accordance with an embodiment of the present invention, apparatus for data storage, including:

an interface, which is configured to communicate with a memory device; and a processor, which is configured to scramble data for storage in the memory device using a given scrambling seed, to assess a statistical distribution of the scrambled data, to compute a measure of randomness of the statistical distribution, to modify, responsively to the measure of randomness, a scrambling configuration of the data, and to store the data having the modified scrambling configuration in the memory device.

There is further provided, in accordance with an embodiment of the present invention, apparatus for data storage, including:

an interface, which is configured to communicate with one or more memory devices; and a processor, which is configured to modify a counter value per each memory page programmed in the memory devices, to select, based on the counter value, a scrambling seed for scrambling a given memory page, to scramble the given memory page using the selected scrambling seed, and to store the scrambled memory page in one of the memory devices.

The present invention will be more fully understood from the following detailed description of the embodiments thereof, taken together with the drawings in which:

DETAILED DESCRIPTION OF EMBODIMENTS

Overview

Figure 1:
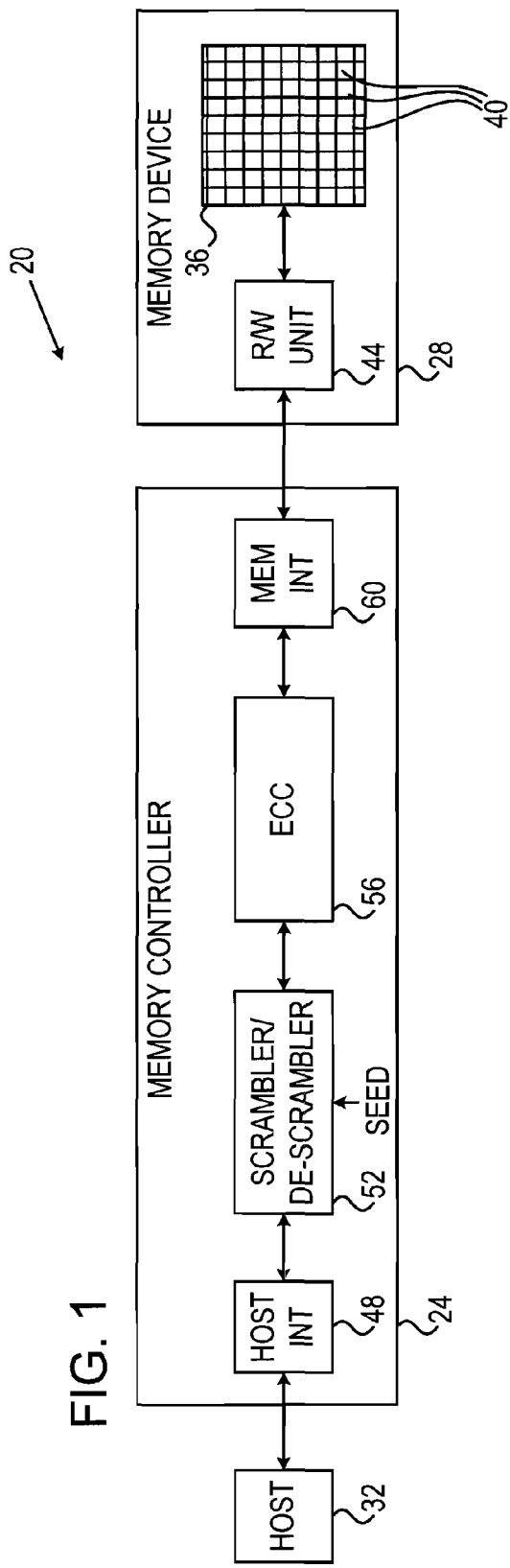
FIG. 1 is a block diagram that schematically illustrates a memory system, in accordance with an embodiment of the present invention.

Data storage systems sometimes scramble data before storing it in memory. Data scrambling (also referred to as data randomization) can be carried out, for example, by performing a bit-wise Exclusive Or (XOR) between the data and a pseudo-random scrambling sequence. Storage of scrambled data has a number of important advantages, such as elimination of severe and repetitive interference effects, and balancing of data-dependent cell wearing across the memory. Some signal processing schemes, such as adaptive estimation of read thresholds, perform better when operating on scrambled data. Although in some cases the data provided for storage already has random statistical properties (e.g., when storing compressed or encrypted data), in other cases the data may not be sufficiently randomized (e.g., in homogeneous areas of an uncompressed image, or when the data is padded with zeros).

Embodiments of the present invention that are described hereinbelow provide improved methods and systems for data scrambling and de-scrambling in storage applications. The embodiments described herein refer mainly to data scrambling in solid-state memory devices, such as Flash devices, but the disclosed techniques are equally applicable to a wide variety of other storage devices and applications.

Some of these methods relate to generation and manipulation of scrambling seeds, which are used for generating the pseudo-random scrambling sequences. In one disclosed technique, a memory controller encodes the scrambling seed with an Error Correction Code (ECC) together with the scrambled data, and stores the encoded data and seed in the memory. In another disclosed method, the memory controller generates the scrambling seed based on a global counter, which is modified (e.g., incremented) per each programming operation.

In some embodiments, the memory controller assesses the statistical distribution of bit values in the scrambled data, and estimates the level of randomness of the distribution. If the scrambled data is not sufficiently random, the memory controller modifies the scrambling configuration. Several techniques for assessing and improving data randomness are described. For example, the memory controller may operate multiple different scramblers in parallel and select the best-performing scrambler, and/or pad the scrambled data with dummy bits.

In some embodiments, the memory controller uses a balanced set of scrambling sequences. In a balanced set, any given bit position in the sequence has a substantially equal probability of being "0" and "1", when calculated over the entire set of sequences. The use of a balanced set of scrambling sequences distributes data-dependent wearing evenly among the memory cells, assuming that programming operations applied to a given cell group use different sequences selected from the set. Several techniques for generating and using balanced sets of scrambling sequences are described herein.

Other embodiments that are described herein provide alternative scrambler/de-scrambler configurations, which provide different trade-offs between storage latency and memory size requirements. Yet another disclosed method uses linearity properties of the ECC in order to perform scrambling concurrently with ECC encoding.

System Description

FIG. 1 is a block diagram that schematically illustrates a memory system 20, in accordance with an embodiment of the present invention. System 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

System 20 comprises a memory controller 24, which stores data in a memory device 28 and retrieves data stored in the memory device. Memory controller 24 communicates with a host 32, for accepting data for storage in the memory device and for outputting data retrieved from the memory device.

Memory device 28 stores the data received from the memory controller in a memory cell array 36. The memory array comprises multiple analog memory cells 40. In the context of the present patent application and in the claims, the term "analog memory cell" is used to describe any memory cell that holds a continuous, analog value of a physical parameter, such as an electrical voltage or charge. Array 36 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells.

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

Memory device 28 comprises a reading/writing (R/W) unit 44, which converts data for storage in the memory device to analog storage values and writes them into memory cells 40. In alternative embodiments, the R/W unit does not perform the conversion, but is provided with voltage samples, i.e., with the storage values for storage in the cells. When reading data out of array 36, R/W unit 44 converts the storage values of memory cells into digital samples having a resolution of one or more bits. Data is typically written to and read from the memory cells in groups that are referred to as pages. In some embodiments, the R/W unit can erase a group of cells 40 by applying one or more negative erasure pulses to the cells.

Memory controller 24 comprises a host interface 48 for communicating with host 32. The data accepted from the host is scrambled, or randomized, using a scrambling/de-scrambling unit 52 before it is sent to memory device 28 for storage. Data scrambling is desirable, for example, in order to avoid severe interference scenarios and to balance the wear of memory cells 40. Data retrieved from memory device 28 is de-scrambled by unit 52 before it is provided to the host. The operation of unit 52, as well as several techniques for data scrambling and de-scrambling, are described in detail below.

In some embodiments, memory controller 24 comprises an Error Correction Code (ECC) unit 56, which encodes the data for storage using a suitable ECC and decodes the ECC of data retrieved from the memory. Any suitable type of ECC, such as, for example, Low Density Parity Check (LDPC), Reed-Solomon (RS) or Bose-Chaudhuri-Hocquenghem (BCH), can be used. Memory controller 24 communicates with memory device 28 using a memory interface 60.

Figure 2:
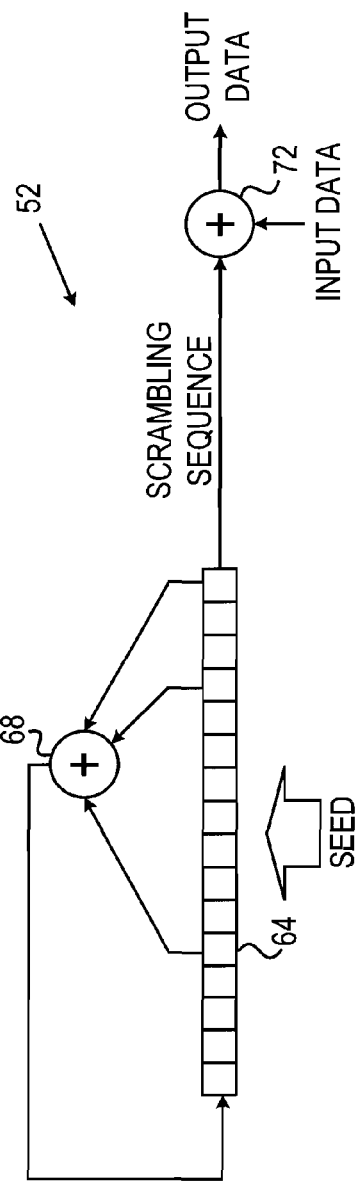
FIG. 2 is a block diagram that schematically illustrates a scrambler/de-scrambler used in a memory system, in accordance with an embodiment of the present invention.

Some or all of the elements of memory controller 24, and in particular scrambling/descrambling unit 52, may be implemented in hardware. An example implementation of unit 52 is shown in FIG. 2 below. Alternatively, the memory controller may comprise a microprocessor that runs suitable software, or a combination of hardware and software elements.

The configuration of FIG. 1 is an example system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity. Although FIG. 1 shows a single memory device 28 for the sake of clarity, in alternative embodiments a single memory controller may control multiple memory devices 28.

In the exemplary system configuration shown in FIG. 1, memory controller 24 and memory device 28 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 24 can be implemented in software and carried out by a processor or other element of the host system. In some embodiments, host 32 and memory controller 24 may be fabricated on the same die, or on separate dies in the same device package.

In some embodiments, memory controller 24 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

In an example configuration of array 36, memory cells 40 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks. In a typical two-bit-per-cell MLC device, each erasure block is on the order of thirty-two word lines, each comprising several thousand cells. Each word line of such a device is often partitioned into four pages (odd/even order cells, least/most significant bit of the cells). Three-bit-per cell devices having thirty-two word lines per erasure block would have 192 pages per erasure block, and four-bit-per-cell devices would have 256 pages per block. Alternatively, other block sizes and configurations can also be used.

Some memory devices comprise two or more separate memory cell arrays, often referred to as planes. Since each plane has a certain "busy" period between successive write operations, data can be written alternately to the different planes in order to increase programming speed.

Example Scrambler/De-Scrambler Structure

FIG. 2 is a block diagram that schematically illustrates scrambling/de-scrambling unit 52, in accordance with an embodiment of the present invention. Unit 52 scrambles data by producing a pseudo-random scrambling sequence, and calculating a bit-wise Exclusive Or (XOR) between the scrambling sequence and the data. De-scrambling is performed in a similar manner, i.e., by calculating bit-wise XOR between the scrambled data and the scrambling sequence, to reproduce the original data.

In the present example, unit 52 produces the scrambling sequence using a Linear Feedback Shift Register (LFSR). Unit 52 comprises an N-bit shift register 64. The content of shift register 64 is shifted one bit to the right in each clock cycle. A XOR gate 68 computes a XOR of a predefined subset of the shift register bits, and the XOR result is fed-back to the shift register input. The output of shift register 64 is used as a scrambling sequence. Given an appropriate selection of feedback taps (i.e., selection of shift register bits to be XOR'ed and fed-back to the input), the scrambling sequence has pseudo-random properties.

A XOR gate 72 calculates bit-wise XOR between an input data sequence and the scrambling sequence, to produce an output data sequence. When unit 52 performs scrambling, the input data comprises data accepted from the host, and the output data comprises scrambled data to be sent to the memory device. When unit 52 performs de-scrambling, the input data comprises scrambled data read from the memory device, and the output data comprises de-scrambled data to be sent to the host.

When unit 52 initiates scrambling or de-scrambling certain data, the memory controller initializes shift register 64 to a certain N-bit initial value, referred to as a seed. The scrambling seed can be viewed as an initial offset along the scrambling sequence, from which the sequence generation begins. Therefore, setting an N-bit seed value can be viewed as selecting a scrambling sequence from a set of $2^N$ possible scrambling sequences. Several methods for generating and manipulating scrambling seeds and sequences are described below.

Typically although not necessarily, a given scrambling sequence originating from a given seed is used for scrambling (or de-scrambling) a memory page. For example, a page having 34,368 bits can be scrambles by bit-wise XOR with a 34,368-bit scrambling sequence. In some embodiments, unit 52 supports a set of $K<2^N$ possible seed values. Each seed value causes unit 52 to generate a respective pseudo-random scrambling sequence, which typically has small cross-correlation with the scrambling sequences of the other seed values. In an example embodiment, N=16 and K=127. Alternatively, any other suitable values can also be used.

The configuration of FIG. 2 is an example configuration, which is shown purely for the sake of conceptual clarity. In alternative embodiments, any other scrambler/de-scrambler configuration can also be used. For example, various other LFSR configurations are known in the art, and any such configuration can be used for generating scrambling sequences in unit 52. Further alternatively, the scrambling sequence can be generated in advance and stored in a memory, instead of generating it during scrambling or de-scrambling. Several alternative scrambler/de-scrambler schemes are described further below.

In the embodiments described herein, scrambling and de-scrambling are performed per memory page. In other words, unit 52 in memory controller 24 scrambles the data of a given memory page using a certain seed, and stores the scrambled data in a certain memory page of device 28. When retrieving the memory page in question, unit 52 de-scrambles the data read from this memory page using the appropriate seed. Alternatively, however, scrambling and de-scrambling can be applied to any other suitable unit of data, such as to erasure blocks or sectors.

Encoded Storage of Scrambling Seed

In order to de-scramble the data properly, de-scrambling should begin with the same seed used for scrambling the data. In some embodiments, memory controller 24 stores the seed together with the scrambled data in memory device 28. When the data is encoded with ECC prior to storage, the memory controller applies ECC encoding to the seed, as well. When requested to retrieve the data, the memory controller reads the scrambled data and the seed from the memory device, decodes the ECC that encodes both data and seed, and then de-scrambles the retrieved data using the retrieved seed. Using this scheme, de-scrambling is performed using the same seed used for scrambling. Since the seed is also encoded with ECC, it is provided the same level of reliability and error-resilience as the data.

Figure 3:
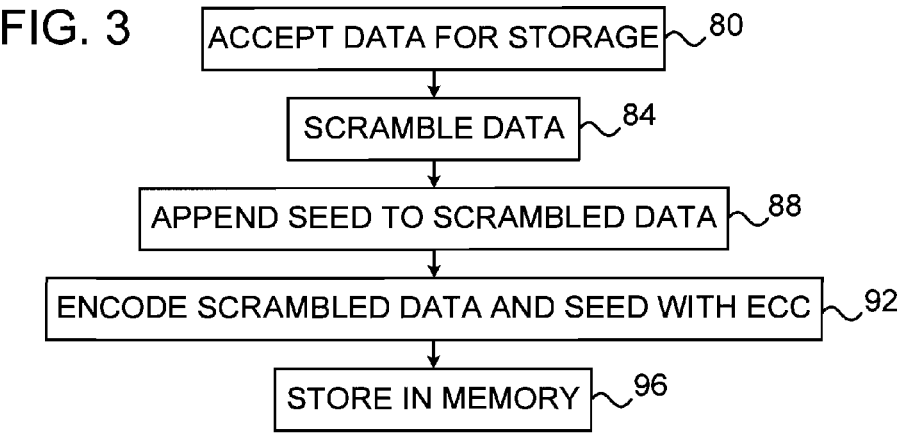
FIGS. 3-8 are flow charts that schematically illustrate methods for data storage using data scrambling, in accordance with embodiments of the present invention.

FIG. 3 is a flow chart that schematically illustrates a method for data storage, in accordance with an embodiment of the present invention. The method begins with memory controller 24 accepting data for storage from host 32, at an input step 80. Unit 52 scrambles the data (e.g., a memory page), at a scrambling step 84. Scrambling begins with a certain seed, as explained above. The memory controller appends the seed to the scrambled data, at an appending step 88. ECC unit 56 encodes both the scrambled data and the seed with ECC, at an encoding step 92. Typically, the ECC unit encodes both the scrambled data of the page and the seed in a single ECC code word. Memory controller 24 then stores the encoded scrambled data and seed in a given memory page in memory device 28, at a storage step 96.

When retrieving the data, the memory controller performs the operations of FIG. 3 in reverse order. The memory controller reads the given page from memory device 28, applies ECC decoding to the page (which comprises both scrambled data and seed), separates the seed from the scrambled data, and de-scrambles the data using the retrieved seed. The de-scrambled data is provided to the host.

Note that in the scheme of FIG. 3 the seed and the data are both encoded in the same ECC code word. If this code word is decoded successfully, both the seed and the data are free of errors. If, on the other hand, ECC decoding of the code word fails, the seed may contain errors that may prevent correct de-scrambling and thus render the data useless. In the latter case, however, the data itself is likely to contain errors anyway, because the seed is considerably shorter than the data. Therefore, the scheme of FIG. 3 is particularly suitable for applications having little or no tolerance for errors (applications in which a single error in the data causes discarding of the entire page). For these kinds of applications, the scheme of FIG. 3 gives the seed the right amount of protection—without overprotection that wastes valuable storage area. It may be possible in principle to protect the seed separately, for example using a separate ECC or by storing it at higher reliability (e.g., using a smaller number of programming levels). These solutions, however, either over-protect the seed and waste storage area, or have a risk of missing cases where the data could be detected but the seed contained errors. Nevertheless, the method of FIG. 3 can be used with error-tolerant applications, as well.

In some embodiments, the memory controller uses a given scrambling seed per erasure block rather than per page. In an example embodiment, the memory controller changes the seed of a given block each time the block is erased. The memory controller may store the currently-used seed in memory device 28, either in the corresponding block or separately. When erasing a given block, the memory controller may read the currently-used seed, specify a different seed for subsequent programming in that block, and store the new seed. In these embodiments, scrambling can still be performed per-page, with a different seed for each page in the block. For example, the seed assigned to a particular page in the block can be derived from the block's seed through some predefined relation (e.g. a function of the block seed and the page address).

Seed Generation Using Global Counter

In many memory devices, it is desirable that different programming operations to a given physical location (e.g., physical memory page) will use different scrambling seeds. In particular, it is desirable that different programming operations to a given physical location will use the different possible seed values approximately evenly. Varying the scrambling seed in different programming operations to the same physical location balances the wear of the memory cells at this location. As a result, the variance of the cells' analog storage values (e.g., threshold voltages or charge levels) is reduced, and readout performance is improved.

In some embodiments, memory controller 24 derives the seed value from a global counter, which is incremented (modulo K, which is a prime number) per each programming operation carried out by the memory controller. This scheme causes, with high likelihood, different programming operations to the same physical page to be performed with different seed values. Note that the global counter is associated with the memory controller, and not necessarily with the memory device. Thus, when memory controller 24 controls multiple memory devices 28 (e.g., different devices and/or different dies or planes in the same device), the global counter is incremented per each programming operation applied to any of these devices. As a result, the likelihood of using different seeds in different programming operations is further increased.

Figure 4:
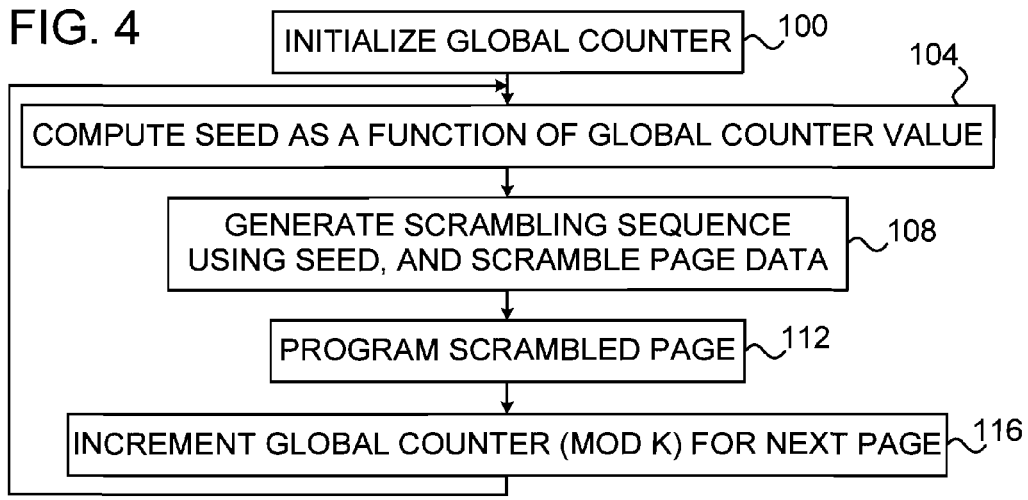

FIG. 4 is a flow chart that schematically illustrates a method for data scrambling and storage using a global counter, in accordance with an embodiment of the present invention. The method begins with memory controller 24 initializing the global counter, at an initialization step 100. The counter is typically initialized at power-up, and may be initialized to any desired value, such as to zero.

When preparing to program a page, the memory controller selects a scrambling seed for this page based on the global counter value, at a seed selection step 104. For example, the memory controller may select the seed value using the following operations:

seed_counter=(seed_counter+1) mod 127;
seed_index=(wordline_index*15+seed_counter) mod 128;
seed=seed_table[seed_index];

wherein seed_counter denotes the global counter, seed_table denotes a table holding 128 possible seed values, seed_index denotes the index of the selected seed, wordline_index denotes the index of the word line (an example of a physical location) in which the page is to be stored, and seed denotes the selected seed value extracted from seed_table.

Having selected a seed value for programming the next page, memory controller 24 scrambles the page using the selected seed value, at a page scrambling step 108. Typically, unit 52 in the memory controller generates a scrambling sequence using the selected seed value, and scrambles the page data using the scrambling sequence. The memory controller then stores the scrambled page at the desired location in memory device 28, at a programming step 112. Memory controller 24 increments the global counter (modulo K), at a counter incrementing step 116. The method then loops back to step 104 above, in which the memory controller selects a seed value for the next page to be programmed based on the new global counter value.

In the description above, the global counter is incremented per each programming operation performed by the memory controller. In alternative embodiments, however, the global counter can be decremented or otherwise modified in response to the respective programming operations performed by the memory controller.

Modifying the Scrambling Scheme Based on Randomization Performance

In some embodiments, after scrambling a given page, memory controller 24 assesses the statistical distribution of the bit values in the scrambled page, and estimates the level of randomness of the distribution. The memory controller verifies whether the randomness meets a certain expected level. If not, the memory controller modifies the scrambling configuration in order to increase the randomness in the page. In some embodiments, the scrambling configuration may be modified more than once, e.g., until reaching a satisfactory level of randomness.

Figure 5:
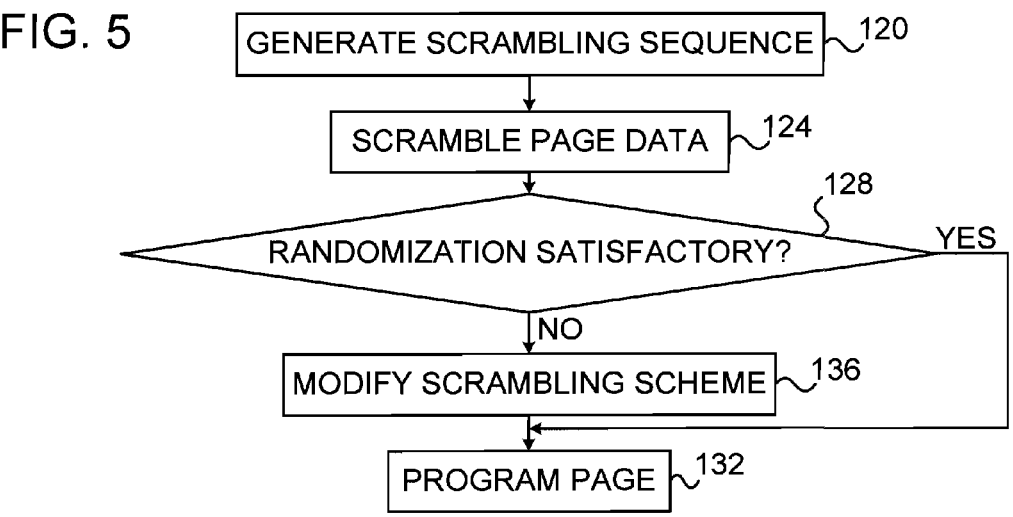

FIG. 5 is a flow chart that schematically illustrates a method for data storage that uses randomness verification, in accordance with an embodiment of the present invention. The method begins with unit 52 in memory controller 24 generating a certain scrambling sequence, at a sequence generation step 120. Unit 52 scrambles a memory page using this scrambling sequence, at a memory page scrambling step 124. The memory controller assesses the bit value distribution in the scrambled page, and checks whether the randomness of the distribution is sufficient, at a randomness assessment step 128. If sufficient, the memory controller programs the page in the memory device, at a page programming step 132. Otherwise, i.e., if the level of randomness in the scrambled page is considered insufficient, the memory controller modifies the scrambling configuration, at a scrambling modification step 136. The memory controller then programs the page at step 132, and the method terminates.

In some embodiments, memory controller 24 assesses the level of randomness (at step 128) by comparing the number of "0" and "1" bit values in the scrambled page. If the number of "0" bit values is similar to the number of "1" bit values, the page is regarded as scrambled with sufficient randomness, and vice versa. For example, the memory controller may set a threshold on the difference between the number of "0" and "1" bit values in the scrambled page. If the difference is smaller than the threshold the page is regarded as sufficiently random, and vice versa. Alternatively, the memory controller may use any other technique or logic for assessing the randomness in the scrambled page.

Upon detecting an insufficiently-random page, the memory controller may modify the scrambling scheme (at step 136) in various ways. For example, the memory controller may add one or more dummy bits to the scrambled data, in order to reduce the difference between the number of "0" and "1" bit values. In an example embodiment, a group of dummy bits (e.g., sixteen bits) is assigned for this purpose in each page. The memory controller can set these bits to any desired value, in order to eliminate (or at least reduce) the difference between the total number of "0" and "1" bit values in the page. (Note that dummy bits can be added to the data regardless of whether the level of randomness is considered sufficient or not. For example, the memory controller may add dummy bits in every page, unconditionally. Unconditional addition of dummy bits is especially suitable for implementations in which a portion of the page is assigned to dummy bits and is not used for other purposes.)

As another example, upon detecting an insufficiently-random page, the memory controller may select a different scrambling seed and re-scramble the page using the new seed. In some embodiments, the memory controller may change the seed until a certain satisfactory randomness level is reached. Alternatively, the memory controller may scramble the page multiple times using different candidate seed values, and select the seed value that provides the best randomness. In these embodiments, the memory controller may comprise multiple scrambling/de-scrambling units (e.g., unit 52 of FIG. 2), which operate in parallel using different seed values. The memory controller may use any desired number of candidate seeds. Typically, using a large set of candidate seeds increases complexity but may achieve better scrambling performance, and vice versa.

As yet another example, the memory controller may balance the number of "0" and "1" bit values in the page by dividing the page data into multiple sections, scrambling one or more sections using the scrambling sequence generated by the selected seed, and scrambling the remaining (one or more) sections using an inverse of this scrambling sequence. (In the present context, an inverse of a sequence is produced by flipping the bit values of the sequence, replacing "1" with "0" and vice versa.) Typically, if a given scrambling sequence causes a certain imbalance in the number of "0" and "1" bit values, the inverse of this sequence is likely to cause the opposite effect. Thus scrambling part of the page with a certain scrambling sequence, and another part with the inverse of this sequence, can improve the balance of "0" and "1" bit values. Typically, the memory controller stores information regarding the scrambling sequence polarity (i.e., whether scrambling was performed using the sequence or its inverse) in each section together with the scrambled data.

In some embodiments, the memory controller may decide whether to scramble each section with the sequence or its inverse in a progressive manner. In these embodiments, the memory controller typically scrambles the first section using the sequence, checks whether the data scrambled so far is balanced, and accordingly decides whether to use the sequence or its inverse in the next section.

When intending to scramble a given section, the memory controller typically attempts both possibilities (the sequence or its inverse) and selects the best-performing option. In other words, the memory controller scrambles the current section with the scrambling sequence, and then assesses the balance (randomness) of the data scrambled so far (including the previous sections and the current section). The memory controller then scrambles the current section using the inverse of the scrambling sequence, and again assesses the balance of the data scrambled so far, including the current section. The memory selects whether to scramble the current section using the sequence or its inverse based on the two assessments.

The progressive selection process described above is not limited to the use of a sequence and its inverse. For example, the memory controller may hold a set of section-size candidate scrambling sequences (or corresponding seeds). At each stage, the memory controller selects one of the candidate seeds for scrambling the next section. The selected seed is the one that, once applied to the current section, causes the entire data scrambled so far to have the highest level of randomness.

In some embodiments, the memory controller may combine two or more of the above-described balancing mechanisms. For example, the memory controller may run several scramblers in parallel and select the best-performing scrambling sequence. Then, if the selected sequence does not balance the "0" and "1" bit values completely, the memory controller can insert one or more dummy bits in order to eliminate the residual imbalance.

Additionally or alternatively, the memory controller may use any other suitable method for assessing the statistical distribution of bit values in the scrambled data, assessing the level of randomness of the distribution, and modifying the scrambling configuration if necessary. In some embodiments, the memory controller may modify the scrambling configuration more than once, using any of the techniques described above. For example, after performing scrambling modification step 136 of FIG. 5, the method may loop back to randomness assessment step 128 in order to check whether the modified scrambling configuration achieves a sufficient level of randomness. If not, the scrambling configuration can be modified again.

The above description refers mainly to Single-Level Cell (SLC) memory, in which each memory cell stores a single data bit. Many memory systems, however, use Multi-Level Cells (MLC), each storing P≥2 bits in multiple memory states. Typically, in a group of memory cells, different MLC bits are associated with different memory pages. For example, in an eight-level 3 bits/cell memory, the Least Significant Bits (LSB) of a given memory cell group store one page, the Center Significant Bits (CSB) store another page, and the Most Significant Bits (MSB) store a third page.

In MLC devices, the randomness requirement can be generalized to a requirement that the number of memory cells programmed to each memory state (i.e., to a specific combination of P bit values) be approximately the same after scrambling. Balancing the number of "0" and "1" bit values separately in each page, however, does not guarantee that the MLC memory states are balanced. In some embodiments, the memory controller checks whether the above-mentioned MLC balancing requirement holds for a given group of multi-level cells (e.g., a word line). If not, the memory controller modifies the scrambling configuration, so as to balance the number of memory cells corresponding to the different programming states.

In some embodiments, the memory controller selects the scrambling seeds for pages mapped to different MLC bits (e.g., for the LSB, CSB and MSB pages of a 3 bits/cell word line) from disjoint sets of candidate seeds. This feature helps to distribute the number of memory cells in the word line approximately evenly among the different memory states. This sort of selection avoids scenarios in which two or more pages in the same word line are scrambled with the same seed, a scenario that causes uneven distribution among memory states.

Scrambling Using a Balanced Set of Scrambling Sequences

As explained above with respect to FIG. 4, memory controller 24 typically changes the scrambling seed (and thus the scrambling sequence) that is used in different programming operations to a given physical memory location (e.g., physical memory page). However, even when this method is used, there is a risk that different memory cells will experience different wear levels.

Consider, for example, a memory system that uses a 7-bit seed, i.e., a set of 128 scrambling sequences. The length of each sequence is denoted L, which also denotes the number of data bits in each page. In order to ensure uniform wear of memory cells, it is desirable that the $i^{th}$ bit in the scrambling sequence will be "0" in 50% of the scrambling sequences and "1" in the other 50%. This condition should be met for all i, i=1 ... L. Otherwise, a memory cell that stores the $i^{th}$ bits of the different scrambling sequences, and another memory cell that stores the $j^{th}$ bits of the different scrambling sequences, may have different probabilities of assuming "0" or "1" values.

In order to meet the above-described condition, in some embodiments memory controller 24 uses a balanced set of L-bit scrambling sequences. The set is balanced by defining the scrambling sequences such that the distribution of the bit values in any given bit position satisfies a predefined statistical criterion. In a typical embodiment, the criterion specifies that for any 1≤i≤L, the 1 bit in the sequence is "0" in half of the scrambling sequences, and is "1" in the other half. The balancing criterion can be somewhat relaxed by specifying that the $i^{th}$ bit in the sequence is "0" in a predefined portion of the scrambling sequences, which may deviate from 50%. For example, a set of scrambling sequences in which (for any i) the $i^{th}$ bit in the sequence is "0" in 40%-60% of the sequences can also be regarded as a balanced set of sequences. Further alternatively, any other suitable statistical criterion can also be used.

In some embodiments, the memory controller produces a balanced set of scrambling sequences by adding another bit to the seed value. The additional bit (denoted "flip-bit") indicates to unit 52 whether scrambling is to be performed using the scrambling sequence or using its inverse. Thus, the flip-bit mechanism is equivalent to doubling the set of scrambling sequences, by adding the inverse of each scrambling sequence to the set. For example, adding an eighth flip-bit to the above-described 7-bit seed would double the set of scrambling sequences from 128 to 256. Since the $i^{th}$ bit in a given sequence is by-definition the opposite of the $i^{th}$ bit in the corresponding inverse sequence, the flip-bit mechanism causes the set of sequences to be balanced. In alternative embodiments, memory controller 24 may use any other suitable mechanism for generating a balanced set of scrambling sequences.

(The statistical properties of the scrambling sequences are especially important when the data provided for storage is not sufficiently randomized, e.g., in homogeneous areas of an uncompressed image, or when the data is padded with zeros. In these cases, the statistics of the scrambled data is determined by the statistics of the scrambling sequence. When the data provided for storage already has random statistical properties, e.g., when storing compressed or encrypted data, the statistics of the scrambled data will usually be random regardless of the statistics of the scrambling sequence.)

Figure 6:
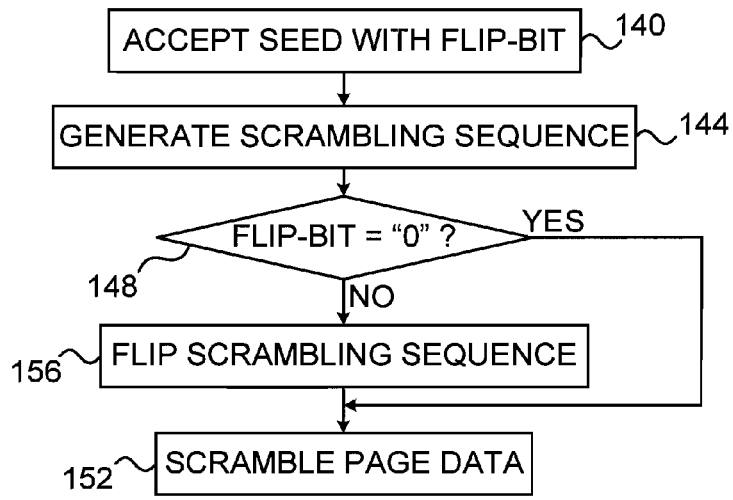

FIG. 6 is a flow chart that schematically illustrates a method for scrambling a memory page, in accordance with an embodiment of the present invention. The method begins with unit 52 in memory controller 24 accepting a scrambling seed that includes a flip-bit, at a seed input step 140. The seed comprises a total of N+1 bits, of which N bits are the seed from which the scrambling sequence is to be generated, and one bit is a flip-bit.

Unit 52 generates a scrambling sequence using the seed provided at step 140, at a sequence generation step 144. Unit 52 checks whether the flip-bit provided at step 140 equals "0" or "1", at a flip-bit checking step 148. If the flip-bit equals "0", unit 52 scrambles the page using the scrambling sequence generated at step 144 above, without reversing the sequence, at a scrambling step 152. Otherwise, i.e., if the flip-bit equals "1", unit 52 flips (i.e., negates or reverses) the bits of the scrambling sequence, at a sequence inversing step 156. Unit 52 then scrambles the page using the inverse scrambling sequence, at scrambling step 152. Typically, the value of the flip-bit is stored (usually as part of the seed) with the page data in memory device 28, in order to enable correct de-scrambling.

Note that in the description above a flip-bit value of "0" indicates that no inversing is to be performed, and "1" indicates that the inverse sequence is to be used. This choice, however, is made purely by way of example. In alternative embodiments, any other mechanism can be used to indicate to unit 52 whether to use the scrambling sequence or its inverse. The description above referred to scrambling of memory pages. Generally, however, any other type of L-bit data words can be scrambled using this method.

As explained with respect to FIG. 5 above, in an MLC device, the memory controller may select the scrambling seeds or sequences in a way that equalizes the numbers of memory cells programmed to different memory states. In some embodiments, the memory controller may use the flip-bit mechanism for this purpose. In an example embodiment, the memory controller may use the flip-bit mechanism for each page separately, as explained in FIG. 6. In addition, the memory controller can verify that, in the M pages stored in a given word line, the $2^M$ possible flip-bit value combinations are used approximately evenly. This condition causes even distribution of the memory cells among the different MLC memory states.

Storage of Previously-Generated Scrambling Sequences

In the configuration of FIG. 2 above, unit 52 comprises a LFSR, which generates a scrambling sequence serially when scrambling or de-scrambling a memory page. As can be appreciated, this sort of serial generation may introduce latency into the scrambling process. Moreover, some memory systems support random read and write operations, which enable programming and readout of only part of a page, which may be located at various positions within the page. When performing random read or write, the LFSR of FIG. 2 above would have to be cycled from the beginning of the scrambling sequence until reaching the position in the sequence that matches the part of the page being read or written. Only then the part of the page being read or written can be XOR'ed with the corresponding part of the scrambling sequence. This process adds considerable latency to random read and write operations.

In some embodiments, memory controller 24 stores a previously-generated copy of a scrambling sequence in memory, instead of generating the sequence serially during programming or readout. The sequence can be stored in a suitable on-chip memory of the memory controller, such as in a Look-Up Table (LUT). When performing a random access (read or write) of a partial part of a page, the memory controller can retrieve the corresponding part of the scrambling sequence from the LUT, and thus perform scrambling or de-scrambling using only the relevant part of the scrambling sequence without unnecessary delay. This technique can be applied to any desired number of scrambling sequences.

Figure 7:
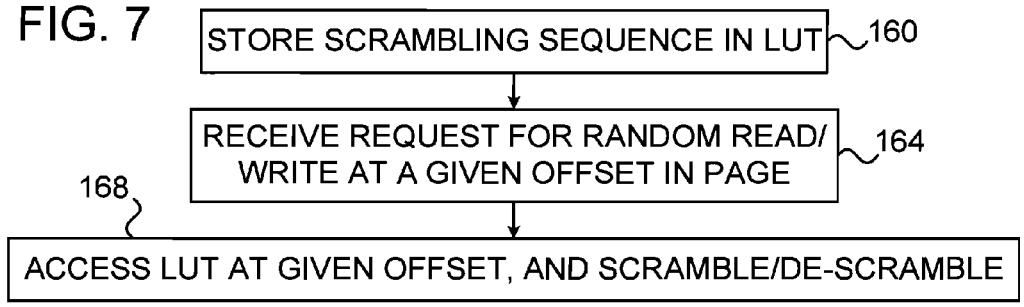

FIG. 7 is a flow chart that schematically illustrates a method for data scrambling or de-scrambling, in accordance with an embodiment of the present invention. The method begins with memory controller 24 storing a previously-generated scrambling sequence in a LUT, at a sequence storage step 160. The memory controller receives a request to access (read or write) a part of a page, at a random access request step 164. The part of the page to be read or written is located at a certain offset in the page.

In order to scramble or de-scramble the data of the part of the page being written or read, the memory controller accesses the LUT at the relevant offset, at a sequence access step 168. The memory controller retrieves the relevant part of the scrambling sequence (the part that corresponds to the part of the page being read or written), without a need to generate the sequence from the beginning. The memory controller then scrambles or de-scrambles the data using the retrieved part of the scrambling sequence.

The method of FIG. 7 may reduce latency, but comes at the expense of controller memory size. The memory size required in the controller is particularly large for large page sizes (and thus long scrambling sequences). In some embodiments, the memory controller applies a hybrid solution, which trades-off some memory size for latency. In some embodiments, the memory controller stores the LFSR state (i.e., the content of shift register 64) for multiple offsets along the scrambling sequence. For example, the memory controller may store the LFSR state for offsets 0, 100, 200, . . . or at any other desired granularity. When requested to scramble or de-scramble a part of a page at a given offset, the memory controller initializes shift register 64 to the nearest available offset that does not exceed the requested offset. Then, unit 52 runs the LFSR until reaching the desired offset.

For example, consider a scenario in which the memory controller stores the LFST state at offsets 0, 100, 200, 300 . . . in the scrambling sequence. If the memory controller is requested to perform random write starting at an offset of 214 bits in the page, the memory controller initializes shift register 64 with the state of offset 200, and then runs the shift register for 14 clock cycles. As can be appreciated, this technique trades-off memory size for latency. Storing the LFSR state at more offset values increases the required memory size, but enables reaching any desired offset at fewer clock cycles.

Concurrent Scrambling and ECC Encoding

As explained with respect to FIG. 5 above, in some embodiments memory controller 24 scrambles a given page using multiple alternative scrambling sequences in parallel, and then selects the scrambled page having the best data randomness. For example, the memory controller may select the scrambled page in which the numbers of "0" and "1" bit values are most balanced. When using this technique, however, ECC unit 56 can typically start ECC encoding only after the appropriate scrambling sequence has been selected. As a result, the latency of the storage process may increase considerably.

When the ECC used in system 20 is linear, the scrambling and ECC encoding tasks can be separated and parallelized. For a linear ECC, the scrambling and ECC encoding operation can be re-written as $$\text{ECC}(\text{DATA XOR SCRAMBLING}_{SEQ}) = (\text{ECC}(\text{DATA}) \text{ XOR ECC}(\text{SCRAMBLING}_{SEQ}))$$

wherein DATA denotes the page data, $\text{SCRAMBLING}_{SEQ}$ denotes a scrambling sequence, and ECC( ) denotes the ECC encoding operation.

In other words, instead of scrambling the data and then encoding the scrambled data, it is possible to encode the un-scrambled data, separately encode the scrambling sequence, and then calculate a bit-wise XOR between the encoded data and the encoded scrambling sequence. Memory controller 24 may use this equivalence to reduce the total latency of the scrambling and ECC encoding process.

In some embodiments, the memory controller encodes the different possible scrambling sequences with ECC, and stores the encoded scrambling sequences for future use. The terms ($\text{ECC}(\text{SCRAMBLING}_{SEQ})$) are data-independent. When receiving a data page for storage, the memory controller encodes the page data with ECC (i.e., produces ECC(DATA)) irrespective of scrambling. At least partially in parallel, the memory controller scrambles the data with the different scrambling sequences and identifies the best-performing scrambling sequence. Then, the memory controller calculates the XOR between ECC(DATA) and the previously-stored $\text{ECC}(\text{SCRAMBLING}_{SEQ})$ of the selected scrambling sequence. Since ECC encoding of the data is performed in parallel to scrambling, the overall storage latency is reduced.

Figure 8:
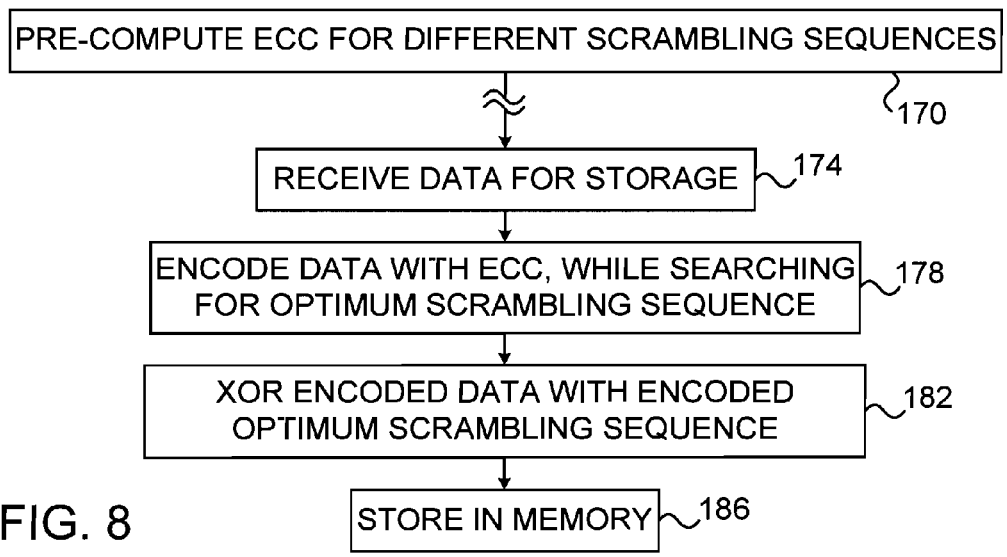

FIG. 8 is a flow chart that schematically illustrates a method for data storage, in accordance with an embodiment of the present invention. The method begins with memory controller 24 pre-computing and holding ECC(SCRAMBLING$_{SEQ}$) for the different possible scrambling sequences, at an ECC pre-computing step 170. At a later point in time, memory controller 24 receives a data page for storage, at an input step 174. The memory controller encodes the un-scrambled data page (i.e., calculates ECC(DATA)), while in parallel scrambling the data and searching for the best-performing scrambling sequence, at an encoding and scrambling step 178.

At the end of step 178, the memory controller has computed ECC(DATA) and has selected the scrambling sequence producing the best randomness. The memory controller calculates a XOR between ECC(DATA) and the pre-computed ECC of the selected scrambling sequence (ECC(SCRAMBLING$_{SEQ}$)), at a XOR step 182. The result of step 182 is equivalent to ECC(DATA XOR SCRAMBLING$_{SEQ}$), i.e., the ECC of the data after scrambling with the optimum scrambling sequence. The memory controller stores this result in memory device 28, at a result storage step 186.

Although the embodiments described herein mainly address data scrambling for storage in non-volatile solid state memory devices, the methods and systems described herein can also be used for storage in other types of memory devices, such as Hard Disk Drives (HDD).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising: encoding data for storage in a memory device with an Error Correction Code (ECC); encoding a given scrambling seed with the ECC; scrambling the encoded data dependent upon the encoded scrambling seed; determining a statistical distribution of the scrambled encoded data; computing a measure of randomness of the scrambled encoded data dependent upon the determined statistical distribution; and modifying a scrambling configuration of the scrambled encoded data dependent upon the computed measure of randomness; storing the encoded data having the modified scrambling configuration in the memory device; wherein scrambling the encoded data comprises: encoding two or more candidate scrambling seeds with the ECC; scrambling the encoded data with each of the two or more encoded candidate scrambling seeds, to create a respective two or more scrambled encoded data; wherein computing the measure of randomness comprises computing a respective level of randomness for each of the respective two or more scrambled encoded data; and wherein modifying the scrambling configuration comprises selecting one of the respective two or more scrambled encoded data dependent upon the respective levels of randomness.

2. The method according to claim 1, wherein computing the measure of the randomness comprises comparing a first number of "0" bit values in the scrambled encoded data with a second number of "1" bit values in the scrambled data.

3. The method according to claim 1, wherein modifying the scrambling configuration comprises adding one or more dummy bits to the scrambled encoded data.

4. The method according to claim 1, wherein modifying the scrambling configuration comprises; encoding another scrambling seed with the ECC, wherein the another scrambling seed is different than the given scrambling seed; scrambling the encoded data using another scrambling seed, dependent upon the encoded another scrambling seed.

5. The method according to claim 1, wherein scrambling the encoded data comprises operating two or more scrambling units concurrently, each scrambling unit scrambling the encoded data using a respective one of the two or more encoded candidate scrambling seeds.

6. The method according to claim 1, wherein modifying the scrambling configuration comprises dividing the encoded data into multiple sections, scrambling the encoded data in at least one of the sections using one of the two or more encoded candidate scrambling seeds, and scrambling the encoded data in at least another of the sections using another of the two or more encoded candidate scrambling seeds.

7. The method according to claim 1, wherein modifying the scrambling configuration comprises dividing the encoded data into multiple sections, scrambling the encoded data in at least one of the sections using a scrambling sequence derived from the encoded scrambling seed, and scrambling the encoded data in at least another of the sections using an inverse of the scrambling sequence.

8. The method according to claim 1, wherein the memory device comprises a group of multi-level memory cells, each storing at least first and second bits in one of multiple different memory states, and wherein modifying the scrambling configuration comprises balancing respective numbers of the memory cells in the group that are programmed to the different programming states.

9. The method according to claim 8, wherein the first bits of the memory cells in the group store a first memory page and the second bits of the memory cells in the group store a second memory page, and wherein balancing the numbers comprises selecting first and second scrambling seeds, for respectively scrambling the first and second memory pages, from respective first and second disjoint sets of candidate scrambling seeds.

10. Apparatus for data storage, comprising: an interface, which is configured to communicate with a memory device; and a processor, which is configured to; encode data for storage in the memory device with an Error Correction Code (ECC); encode a scrambling seed with the ECC; scramble the encoded data for storage in the memory device dependent upon the encoded scrambling seed; determine a statistical distribution of the scrambled encoded data; compute a measure of randomness of the scrambled encoded data dependent upon the determined statistical distribution; modify, a scrambling configuration of the scrambled encoded data dependent upon the computed measure of randomness of the scrambled data; store the scrambled encoded data having the modified scrambling configuration in the memory device.

11. The apparatus according to claim 10, wherein to compute the measure of the randomness, the processor is further configured to compare a first number of "0" bit values in the scrambled encoded data with a second number of "1" bit values in the scrambled encoded data.

12. The apparatus according to claim 10, wherein to modify the scrambling configuration, the processor is further configured to add one or more dummy bits to the scrambled encoded data.

13. The apparatus according to claim 10, wherein to modify the scrambling configuration, the processor is further configured to encode another scrambling seed, different from the given scrambling seed, and scramble the encoded data dependent upon the encoded another scrambling seed; wherein encode the scrambling seed with the ECC, the processor is further configured to encode two or more candidate scrambling seeds with the ECC, and wherein to scramble the encoded data, the processor is further configured to: scramble the encoded data with each of the two or more candidate scrambling seeds to create a respective two or more scrambled encoded data; compute a respective level of randomness for each of the respective two or more scrambled encoded data; and select one of the respective two or more scrambled encoded data scrambled dependent upon the respective levels of randomness.

14. The apparatus according to claim 10, wherein the processor comprises two or more scrambling units operating concurrently, each configured to scramble the encoded data using a respective one of the two or more encoded candidate scrambling seeds.

15. The apparatus according to claim 10, wherein to scramble the encoded data, the processor is further configured to divide the encoded data into multiple sections, to scramble the encoded data in at least one of the sections using one of the two or more encoded candidate scrambling seeds, and to scramble the encoded data in at least another of the sections using another of the two or more encoded candidate scrambling seeds.

16. The apparatus according to claim 10, wherein to scramble the encoded data the processor is further configured to divide the encoded data into multiple sections, to scramble the encoded data in at least one of the sections using a scrambling sequence derived from the encoded scrambling seed, and to scramble the encoded data in at least another of the sections using an inverse of the scrambling sequence.

17. The apparatus according to claim 10, wherein the memory device comprises a group of multi-level memory cells, each storing at least first and second bits in one of multiple different memory states, and wherein the processor is further configured to balance respective numbers of the memory cells in the group that are programmed to the different programming states.

18. The apparatus according to claim 17, wherein the processor is further configured to store a first memory page in the first bits of the memory cells in the group, and a second memory page in the second bits of the memory cells in the group, and to balance the numbers by selecting first and second scrambling seeds, for respectively scrambling the first and second memory pages, from respective first and second disjoint sets of candidate scrambling seeds.

19. A computer-accessible non-transitory storage medium having program instructions stored therein that, in response to execution by a computer system, cause the computer system to perform operations including: receiving, from a host, data to be stored in a memory device; encoding the received data with an Error Correction Code (ECC); initializing a scrambling seed; encoding the scrambling seed with the ECC; scrambling the encoded data dependent upon the encoded scrambling seed; determining a statistical distribution of the scrambled encoded data; computing a measure of randomness of the scrambled encoded data dependent upon the statistical distribution; modifying the encoded scrambling seed dependent upon the computed measure of randomness; re-scrambling the encoded data dependent upon the modified encoded scrambling seed; and storing the re-scrambled encoded data into the memory device; wherein scrambling the encoded data comprises: encoding two or more candidate scrambling seeds with the ECC; scrambling the encoded data with each of the two or more encoded candidate scrambling seeds, to create a respective two or more scrambled encoded data; wherein computing the measure of randomness comprises computing a respective level of randomness for each of the respective two or more scrambled encoded data; and wherein modifying the scrambling configuration comprises selecting one of the respective two or more scrambled encoded data dependent upon the respective levels of randomness.

20. The computer-accessible non-transitory storage medium of claim 19, wherein computing the measure of randomness comprises determining a number of "0" bit values and a number of "1" bit values in the scrambled encoded data.

21. The computer-accessible non-transitory storage medium of claim 20, wherein computing the measure of randomness further comprises comparing the difference between the number of "0" bit values and the number "1" bit values, and a pre-determined threshold value.

22. The computer-accessible non-transitory storage medium of claim 19, wherein modifying the scrambling seed comprises dividing the encoded data into multiple sections, scrambling the encoded data in at least one of the sections using a scrambling sequence derived from the scrambling seed, and scrambling the encoded data in at least another of the sections using an inverse of the scrambling sequence.

* * * * *